(12) United States Patent
Nissen

(10) Patent No.: US 8,574,643 B2
(45) Date of Patent: Nov. 5, 2013

(54) TRANSPARENT CONFECTIONERY PRODUCT

(75) Inventor: Vibeke Nissen, Fredericia (DK)

(73) Assignee: Intercontinental Great Brands LLC, East Hanover, NJ (US)

( * ) Notice: Subject to any disclaimer, the term of this patent is extended or adjusted under 35 U.S.C. 154(b) by 409 days.

(21) Appl. No.: 12/298,058

(22) PCT Filed: Apr. 28, 2006

(86) PCT No.: PCT/DK2006/000233
§ 371 (c)(1),
(2), (4) Date: Oct. 22, 2008

(87) PCT Pub. No.: WO2007/124744
PCT Pub. Date: Nov. 8, 2007

(65) Prior Publication Data
US 2009/0098242 A1    Apr. 16, 2009

(51) Int. Cl.
A23G 4/20        (2006.01)
A23G 4/00        (2006.01)

(52) U.S. Cl.
USPC .................................................. 426/3; 426/5

(58) Field of Classification Search
None
See application file for complete search history.

(56) References Cited

U.S. PATENT DOCUMENTS

| | | | |
|---|---|---|---|
| 4,971,806 A * | 11/1990 | Cherukuri et al. | 426/5 |
| 5,116,626 A | 5/1992 | Synosky et al. | |
| 6,506,424 B2 * | 1/2003 | Nielsen et al. | 426/5 |
| 2004/0115305 A1 | 6/2004 | Andersen et al. | |

FOREIGN PATENT DOCUMENTS

| | | |
|---|---|---|
| EP | 0288 909 | 11/1988 |
| WO | WO 00/25598 | 5/2000 |
| WO | WO 2004/004479 | 1/2004 |
| WO | WO 2004/084649 | 10/2004 |
| WO | WO 2004/098305 | 11/2004 |
| WO | WO 2004/098306 | 11/2004 |
| WO | WO 2004/098307 | 11/2004 |

OTHER PUBLICATIONS

Fiedler, H.P., Lexikon der Hilfstoffe für Pharmacie, Kosmetik und Angrenzende Gebiete (1981) pp. 63-64.
Food and Drug Administration, CFR, Title 21, Sec. 172.615 (Apr. 1, 2007) pp. 66-68.
Hunter, Barney H. et al., Calcium Channel Blockers 1: a review of their mechanisms of action, Pharmacy International (Nov. 1985) pp. 267-271.
Manly, R.S. et al., Substances Capable of Decreasing the Acid Solubility of Tooth Enamel, J. Dent. Res., vol. 28, No. 2, (1949) pp. 160-171.
Martindale, The Extra Pharmacopoeia, 28th Ed., Reynolds, James E.F., Editor, The Pharmaceutical Press, London (1982).
"Standard Test Method for Transparency of Plastic Sheeting," D 1746-03, ASTM International (Oct. 15, 2008) pp. 1-4.
US Code of Federal Regulations, Title 21, vol. 3, Sec. 182.8013-182. 8997 (Apr. 1, 2005).
International Search Report dated Dec. 7, 2006 for Application No. PCT/DK2006/000233.

* cited by examiner

Primary Examiner — Nikki H Dees
(74) Attorney, Agent, or Firm — St. Onge Steward Johnston & Reens LLC

(57) ABSTRACT

The invention relates to a confectionery product comprising at least one transparent module (TM) and at least one form stable support module (SM) and where said transparent module comprises gum base.

By applying a transparent gum base comprising module, also referred throughout the application as a transparent module (TM), a whole new experience is present for the consumer. In some embodiments the confectionery may act and feel like an ordinary confectionery from the moment it is placed in the mouth but at the same time it gives the consumer an advantageous visual impression prior to placing it in the mouth.

28 Claims, 3 Drawing Sheets

Fig. 10
Fig. 11
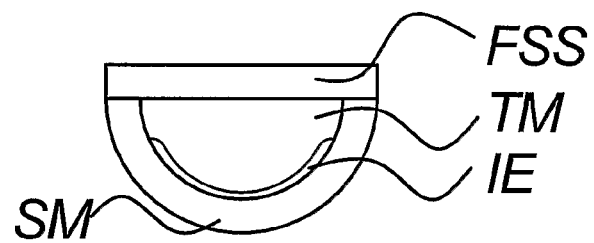
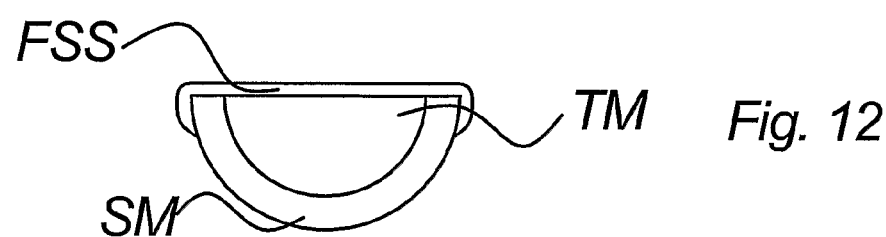
Fig. 12
Fig. 13
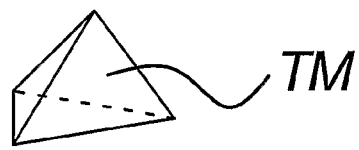
Fig. 14
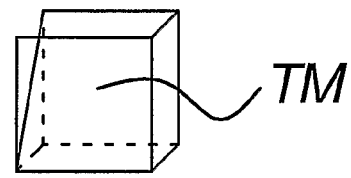

TRANSPARENT CONFECTIONERY PRODUCT

This application claims priority to PCT application Serial. No. PCT/DK2006/000233, Nissen, filed Apr. 28, 2006.

FIELD OF THE INVENTION

The invention relates to the field of confectionery according to claim 1.

BACKGROUND OF THE INVENTION

The invention relates to a confectionery product having visually improved performance in the sense that at least a part of the product is visually transparent to a degree which is suitable for the purpose.

A product of the above type is disclosed in U.S. Pat. No. 5,116,626 where different formulations are provided featuring different degrees of transparency.

A problem related to the described product is that the form-stability is dependent upon the applied polymers in an undesired degree.

SUMMARY OF THE INVENTION

The invention relates to a confectionery product comprising at least one transparent module (TM) and at least one form stable support module (SM) and where said transparent module comprises gum base.

By applying a transparent gum base comprising module, also referred throughout the application as a transparent module (TM), a whole new experience is present for the consumer. In some embodiments the confectionery may act and feel like an ordinary confectionery from the moment it is placed in the mouth but at the same time it gives the consumer an advantageous visual impression prior to placing it in the mouth.

In order to keep the transparent module (TM) in place a support module (SM) is provided which assures that the confectionery keeps the form to the intended degree.

This may typically at minimum be the case at the mechanical contact area(s) between the support module(s) (SM) and the transparent module(s) (TM).

Moreover, the confectionery products offer an improved chew-feel during the relevant two important chew phases, namely the initial chew phase where the chewer basically chews two or more not yet thoroughly mixed confectionery modules—the transparent and the support module (SM)—and the final chew phase where the modules have been mixed by the chewing of the user. The final chew phase may be dealt with by adding e.g. softeners, sweeteners, etc. in the confectionery product's non-transparent modules thereby allowing a mixing of the transparent module (TM) with chew-improving compounds at a stage where the resulting compromising of the visual performance is relatively irrelevant. The initial chew phase may be a little more critical and constrained due to the fact that the visual performance of the module counteract either the structural or rheological performance from the starting point.

An important function of the support module (SM) is to support the transparent module (TM) of the overall multi-module confectionery until consuming, but it may also serve as a reservoir of chew-feel improving compounds which may be both released in the mouth of the consumer as e.g. taste deliverers and also partly be chewed into the transparent gum base module during the final chew phase when the visual performance, as mentioned above, is less important.

A further advantageous feature according to the invention is that the confectionery product, in particular when the transparent module comprises amounts of polyisobutylene, tends to swell when chewed. The rheological experience is in particular significant and advantageous when combining the transparent module with the support module e.g. in the form of a center filled embodiment where the center of the confectionery comprises the transparent module according to the invention and where the module is surrounded by the support module.

The confectionery according to the invention is typically a chewable piece.

In an embodiment of the invention the transparent module (TM) comprises more than 90% by weight of polyisobutylene.

When applying large amounts of polyisobutylene in the transparent module, i.e. larger than about 70% by weight, an advantageous swelling effect is experienced during the initial chewing of the confectionery.

In an embodiment of the invention the transparent module (TM) comprises more than 92% by weight of polyisobutylene. When increasing the amount of polyisobutylene in the confectionery a still improved swelling effect is obtained.

In an embodiment of the invention the transparent module (TM) comprises more than 94% by weight of polyisobutylene. When increasing the amount of polyisobutylene in the confectionery a still improved swelling effect is obtained.

In an embodiment of the invention the transparent module (TM) comprises more than 95% by weight of polyisobutylene. When increasing the amount of polyisobutylene in the confectionery a still improved swelling effect is obtained.

In an embodiment of the invention the transparent module (TM) comprises more than 96% by weight of polyisobutylene. When increasing the amount of polyisobutylene in the confectionery a still improved swelling effect is obtained.

In an embodiment of the invention the transparent module (TM) comprises more than 97% by weight of polyisobutylene. When increasing the amount of polyisobutylene in the confectionery a still improved swelling effect is obtained.

In an embodiment of the invention the transparent module (TM) comprises more than 98% by weight of polyisobutylene. When increasing the amount of polyisobutylene in the confectionery a still improved swelling effect is obtained.

In an embodiment of the invention the transparent module (TM) comprises more than 99% by weight of polyisobutylene. When increasing the amount of polyisobutylene in the confectionery a still improved swelling effect is obtained.

In an embodiment of the invention the transparent module (TM) consist of polyisobutylene.

According to an advantageous embodiment of the invention the transparent module will mainly or only be constituted of transparent gum base. This transparent gum base may further include optional ingredients such sweeteners, active ingredients, flavors.

In an advantageous embodiment of the invention, the main or only elastomer/resin compound of the transparent gum base is polyisobutylene.

In an embodiment of the invention the polydispersity index (PDI) of the polyisobutylene contained in the transparent module (TM) is above 1.

In an embodiment of the invention the polydispersity index (PDI) of the polyisobutylene contained in the transparent module (TM) is above 1.1.

It has been observed that the rheological performance of the transparent module (TM) improves significantly when the polydispersity is increased. In particular, it is noted that a polydispersity above 1.1 results in significantly improved performance of the resulting confectionery products with respect to two important chew phases, namely the initial chew phase where the chewer basically chews two or more not yet thoroughly mixed confectionery modules and the final chew phase where the modules have been mixed. The final chew phase may be dealt with by adding e.g. softeners, sweeteners, etc. in the confectionery product's non-transparent modules thereby allowing a mixing of the transparent module (TM) with chew-improving compounds at a stage where the visual performance is relatively irrelevant. The initial chew phase may be a little more critical and constrained due to the fact that the visual performance of the module counteract either the structural or rheological performance from the starting point.

In an embodiment of the invention the polydispersity index (PDI) of the polyisobutylene contained in the transparent module (TM) is above 2.

In an embodiment of the invention the polydispersity index (PDI) of the polyisobutylene contained in the transparent module (TM) is above 10.

With a high polydispersity an advantageous effect is obtained in the transparent module (TM). The low molecular weight (Mw) polymers are more flexible than the high-molecular weight (Mw) polymers. Hence, when mixing the polymers spread over a wide range the low-molecular weight (Mw) polymers work to plasticize the high-molecular weight (Mw) polymers in order to obtain a final mixture with an appropriate elasticity and consistency.

In an embodiment of the invention the transparent module comprise polyisobutylene in an amount of from 41% to about 100% of said transparent module (TM) by weight.

In an embodiment of the invention the molecular weight (Mw) of the polyisobutylene of said transparent module (TM) is at least 10,000 g/mol In an embodiment of the invention the average molecular weight of the polyisobutylene of said transparent module (TM) is from about 10,000 g/mol to about 450,000 g/mol.

In an embodiment of the invention the molecular weight (Mw) of the polyisobutylene of said transparent module (TM) is less than 100,000 g/mol, preferably less than 80,000 g/mol, more preferably less than 65,000 g/mol.

When the transparent module (TM) is attached to and thereby controlled at least partly with respect to shape by a support module (SM) of the confectionery product, undesired prior art minimum constrictions on the molecular weight of the polyisobutylene may be dealt with in an advantageous way as the problems related to e.g. floating and stickiness may be overcome by means which may at the same time form the form stable support module (SM) and provide advantageous rheological properties contrary to the prior art, where an increasing of the molecular weight of the applied polyisobutylene results in worsened rheological properties.

In an embodiment of the invention the molecular weight (Mw) of the polyisobutylene of said transparent module (TM) is less than 50,000 g/mol.

In an embodiment of the invention the transparent module (TM) constitutes more than 1% by weight of said confectionery.

In an embodiment of the invention the support module (SM) constitutes more than 1% by weight of said confectionery.

In order to be able to stabilize the transparent module (TM) the support module (SM) may advantageously constitute more than 1% by weight of said confectionery.

In an embodiment of the invention the support module (SM) has a thickness of more than 0.1 mm.

It is preferred that the support module (SM) is not fragile when the confectionery is manufactured, distributed and carried in the pockets of the consumer. Hence an appropriate thickness is required.

In an embodiment of the invention the transmittance of the transparent module (TM) is at least 3% through a 10 mm sample of a transparent module (TM) when applying a 546 nm light beam.

The measuring setup and method is described and explained in example 20.

In an embodiment of the invention the transmittance of the transparent module (TM) is at least 20% through a 10 mm sample of a transparent module (TM) when applying a 546 nm light beam.

In an embodiment of the invention the transmittance of the transparent module (TM) is at least 40% through a 10 mm sample of a transparent module (TM) when applying a 546 nm light beam.

In an embodiment of the invention the transmittance of the transparent module (TM) is at least 40% preferably at least 60% measured according to ASTM (D1746-35).

In an embodiment of the invention the transparent module (TM) comprises a transparent polymer.

In an embodiment of the invention the transparent module (TM) is based on polyisobutylene as a transparent polymer.

Polyisobutylene has proven to be a polymer that is markedly suitable for the purpose of acting as a transparent and gum-like chewable polymer in a confectionery product.

In an embodiment of the invention the transparent module (TM) comprises PVA as a transparent polymer.

In an embodiment of the invention the transparent module (TM) comprises PVA in combination with polyisobutylene.

In an embodiment of the invention the transparent module (TM) comprises sweetener.

In an embodiment of the invention the transparent module (TM) comprises liquid sweetener.

According to an embodiment of the invention application of a liquid sweetener improves the resulting visual performance of the transparent module significant when compared to e.g. use of bulk sweetener.

Liquid sweeteners include both sugar and sugarless components in liquid form. The liquid form is typically obtained by a suspension of the sweetener in e.g. water. Sugar sweeteners generally include saccharide-containing components commonly known in the chewing gum art, including but not limited to, sucrose, dextrose, maltose, dextrin, dried invert sugar, fructose, levulose, glactose, corn syrup solids, and the like, alone or in combination. Sugarless sweeteners include, but are not limited to, sugar alcohols such as sorbitol, mannitol, xylitol, hydrogenated starch hydrolysates, maltitol, and the like, alone or in combination.

In an embodiment of the invention the transparent modules comprises liquid sweetener in an amount of less than 50% by weight, preferably less than 30% by weight.

In an embodiment of the invention at least one active ingredient is added to said transparent module (TM).

According to an embodiment of the invention, applicable active ingredients may be selected among those listed in the detailed description.

The physical properties of polyisobutylene makes it almost impenetrable to oxygen, which makes it very suitable to surround active ingredients, which otherwise might be decomposed through prolonged exposure to oxygen.

In an embodiment of the invention the transparent module (TM) comprises flavor.

In an embodiment of the invention the transparent module (TM) comprises flavor in amount of less than 50%, preferably less than 10% by weight.

In an embodiment of the invention the transparent module (TM) comprises coloring agents.

In an embodiment of the invention the transparent module (TM) comprises at least one integrated element (IE).

According to an embodiment of the invention the integrated elements (IE) may be completely or partly incorporated within the transparent module (TM).

Preferably, the integrated elements (IE) should be visually conceivable by the user prior to chewing in order to e.g. provide an improved impression of the confectionery or e.g. facilitate conception of what the integrated element (IE) actually contains or contributes with in the confectionery. This may e.g. be in the case where the confectionery is commercialized as a product having two different and distinct ingredients, preferably active ingredients as a user may actually be able to see two different integrated elements (IE).

Evidently, this feature may also be very advantageous even when using only one integrated element (IE) as a user, again, it may be possible to look into the product and conceive the commercialized ingredient in an intuitive and attractive way.

In an embodiment of the invention the at least one integrated element (IE) comprises confectionery.

In an embodiment of the invention at least one integrated elements (IE) comprises freeze-dried pieces of fruit, artificial sweetener, sugar, flavor, active ingredients, coloring agents or any combination thereof.

According to an embodiment of the invention, applicable active ingredients may be selected among those listed in the detailed description.

In an embodiment of the invention at least one of said integrated elements (IE) are present as individual separate elements in said transparent module (TM).

In an embodiment of the invention the individual separate elements are covered by a, through chewing, easily breakable shell.

In an embodiment of the invention the integrated elements (IE) are distributed and shaped in said transparent module (TM) in order to form a figure.

In an embodiment of the invention coloring agents are added to said individual separate elements in order to improve the visual impression.

In an embodiment of the invention the support module (SM) comprises sweetener releasable during chew.

In an embodiment of the invention the support module (SM) comprises sweetener and flavor releasable during chew.

In an embodiment of the invention the support module (SM) comprises plasticizers to the transparent module (TM).

Advantageously, the support module (SM) may comprise plasticizer(s) to be mixed with the transparent module (TM) during chewing at a stage where the visual performance is relatively irrelevant, thereby modifying the rheological properties of the polyisobutylene of the transparent module (TM) during chewing of the confectionery with respect to plasticization.

In an embodiment of the invention the support module (SM) is form stable.

The term form stable may in this context mean anything that can keep the transparent module (TM) in intended the position. This can mean anything from a totally rigid shape, through an elastic shape to a lightly flexible shape.

Preferably, the support module (SM) should also counteract undesired floating of the transparent module (TM) which tends to be more floatable the more transparent and chewable it gets.

In an embodiment of the invention at least one of said support module (SM) consist of conventional chewing gum.

In an embodiment of the invention the support module (SM) comprises a conventional chewing gum.

By applying a conventional chewing gum as the support module (SM), an advantageous embodiment of the invention has been obtained. In this way the transparent module (TM) and the support module (SM) will be mixed into each other during chewing and soon the feeling and consistency of the product will fully be similar to a conventional chewing gum. Conventional chewing gum in the present context in relation to a support module (SM) includes e.g. both conventionally mixed chewing gum and tabletted chewing gum.

A conventional chewing gum may be one comprising the conventional chewing gum components comprising at least one elastomer and at least one plasticizer. Such chewing gum may e.g. comprise a base part comprising synthetic and natural elastomers and resins plus additional ingredients.

Resin in conventional chewing gum bases typically include synthetic resins such as PVA and natural resins such as rosin esters, which are often referred to as ester gums. Additionally, natural resins such as glycerol esters of partially hydrogenated rosins, glycerol esters of polymerized rosins, glycerol esters of partially dimerised rosins, glycerol esters of tally oil rosins, pentaerythritol esters of partially hydrogenated rosins, methyl esters of rosins, partially hydrogenated methyl esters of rosins and pentaerythritol esters of rosins are typically applied in chewing gum bases. Other resinous compounds typically applied in chewing gum bases include synthetic resins such as telpene resins derived from alpha-pinene, beta-pinene, and/or d-limonene and natural terpene resins.

Synthetic elastomers may include, but are not limited to, polyisobutylene, isobutylene-isoprene copolymer (butyl rubber), styrene-butadiene, copolymers having styrene-butadiene ratios of about 1:3 to about 3:1, PVA, polyisoprene, polyethylene, vinyl acetate-vinyl laurate copolymer having vinyl laurate content of about 5% to about 50% by weight of the copolymer, and combinations thereof.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof.

In an embodiment of the invention the support module (SM), comprising or consisting of chewing gum, comprises any of the ingredients consisting of wax, filler, softener, emulsifier, surfactant, solubilizer or any combination thereof.

In an embodiment of the invention the support module (SM) partly encapsulates said transparent module (TM).

In an embodiment of the invention the support module (SM) completely encapsulates said transparent module (TM).

In an embodiment of the invention the support module (SM) is formed by compression.

One of the support modules (SM) or the only support module (SM) may e.g. be both a compressed chewing gum module and e.g. a compressed tablet free of conventional gum base components such as elastomer and/or resin. Such a support module (SM) may typically be based on tabletted sweetener.

In an embodiment of the invention the support module (SM) comprises a confectionery module.

In this context the word confectionery is meant very broadly and covers e.g. any kind of chewing gum, toffee, liquorice, wine gum, fruit gum, candy, sweets, biscuit, chocolate, ice cream or the like.

An important function of the support module (SM) is to support the transparent module (TM) of the overall multi-module confectionery until consuming, and hence, at the instant the confectionery is placed in the mouth of the consumer, this feature is no longer necessary.

In an embodiment of the invention the support module (SM) is a confectionery.

In an embodiment of the invention the support module (SM) is an edible polymerfilm.

In an embodiment of the invention the support module (SM) is a transparent polymerfilm.

With the use of a transparent polymerfilm as support module (SM), the confectionery may visually seem to only comprise the transparent module $^{TM}$ and the present integrated elements (IE).

In an embodiment of the invention at least part of said support module (SM) is provided by the packaging.

In an embodiment of the invention the support module (SM) is at least partly transparent.

In an embodiment of the invention the support module (SM) is transparent.

In an embodiment of the invention the transparent module (TM) is at least partly encapsulated by said support module (SM) and a further support structure (FSS).

In an embodiment of the invention the transparent module (TM) is at least partly encapsulated by at least one support module (SM) and at least one further support structure (FSS).

In an embodiment of the invention the transparent module (TM) is completely encapsulated by said support module (SM) and said further support structure (FSS).

In an embodiment of the invention the transparent module (TM) is completely encapsulated by at least one support module (SM) and at least one further support structure (FSS).

When applying one or more further support structures (FSS) an enclosure of the transparent module (TM) may be obtained.

In an embodiment of the invention the further support structure (FSS) is at least partly transparent.

In an embodiment of the invention the further support structure (FSS) is removable.

According to an embodiment of the invention, the further support structure (FSS) can be easily removed prior to consuming. The further support structure (FSS) is made of materials that have excellent slip abilities towards the polymer chosen for the transparent module (TM).

In an embodiment of the invention the further support structure (FS S) is part of a toy.

According to an embodiment of the invention, the further support structure (FSS) is part of a toy. I.e. a consumer can buy confectionery integrated in the toy. To exemplify and not to limit the confectionery can e.g. be wheels on a toy car, buttons on a coat or a cap on a teddy bear. In this way a further support structure can form part of a temporary encapsulation and fixation of a transparent module (SM).

In an embodiment of the invention the further support structure (FSS) is edible.

According to an embodiment of the invention, the transparent module (TM), support module (SM) and further support structure (FSS) are edible, whereby the product as a whole is instantly ready for consuming.

In an embodiment of the invention the further support structure (FS S) has a thickness of below 10 mm.

In an embodiment of the invention the confectionery is provided with a coating.

In an embodiment of the invention the coating is selected from the group consisting of hard coating, soft coating and edible film-coating.

In an embodiment of the invention the confectionery comprises coating in an amount of 0.1 to 95% by weight of a coated chewing gum piece.

In an embodiment of the invention the confectionery comprises coating in an amount of 0.1 to 75% by weight of a coated chewing gum piece.

In an embodiment of the invention the confectionery comprises two of more transparent modules (TM).

In an embodiment of the invention the confectionery comprises two or more support modules (SM).

In an embodiment of the invention the confectionery modules as such or the final confectionery product is in a form selected from a pellet, a cushion-shaped pellet, a stick, a tablet, a chunk, a pastille, a pill, a ball and a sphere, a figure, a box-shaped product, an edged product, a rounded product or any combination thereof.

In an embodiment of the invention the weight of the transparent module (TM) is 0.01 to 10 grams, more commonly 0.1 to 5 grams.

In an embodiment of the invention the weight of the confectionery is 0.1 to 20 grams.

In an embodiment of the invention the confectionery product comprises active ingredients according at least one support module (SM), at least one transparent module (TM), at least one integrated element (IE) or any combination thereof.

According to an embodiment of the invention, the confectionery product may comprise a pharmaceutically, cosmetically or biologically active substance. Examples of such active substances, a comprehensive list of which is found e.g. in WO 00/25598, which is incorporated herein by reference.

The active agents to be used in some embodiments may be any substance desired to be released from the confectionery product. If an accelerated rate of release is desired, corresponding to the effect obtained for the flavor, the primary substances are those with limited water solubility, typically below 10 g/100 ml including substances which are entirely water insoluble. Examples are medicines, dietary supplements, oral compositions, anti-smoking agents, highly potent sweeteners, pH adjusting agents, etc.

Further examples of active ingredients include paracetamol, benzocaine, cinnarizine, menthol, carvone, caffeine, chlorhexidine-di-acetate, cyclizine hydrochloride, 1,8-cineol, nandrolone, miconazole, mystatine, aspartame, sodium fluoride, nicotine, saccharin, cetylpyridinium chloride, other quaternary ammoniumcompounds, vitamin E, vitamin A, vitamin D, glibenclamide or derivatives thereof, progesterone, ace-tylsalicylic acid, dimenhydrinate, cyclizine, metronidazole, sodium hydrogencarbonate, the active components from ginkgo, the active components from propolis, the active components from ginseng, methadone, oil of peppermint, salicylamide, hydrocortisone or astemizole.

Examples of active agents in the form of dietary supplements are for instance salts and compounds having the nutritive effect of vitamin B2 (riboflavin), B12, folic acid, niacine, biotine, poorly soluble glycerophosphates, amino acids, the vitamins A, D, E and K, minerals in the form of salts, complexes and compounds containing calcium, phosphorus, magnesium, iron, zinc, copper, iodine, manganese, chromium, selenium, molybdenum, potassium, sodium or cobalt.

Furthermore, reference is made to lists of nutrients accepted by the authorities in different countries such as for instance U.S. code of Federal Regulations, Title 21, Section 182.5013.182 5997 and 182.8013-182.8997, the contents of which are incorporated herein by reference for all purposes.

Examples of active agents in the form of compounds for the care or treatment of the oral cavity and the teeth are for instance bound hydrogen peroxide and compounds capable of releasing urea during chewing.

Examples of active agents in the form of antiseptics are for instance salts and compounds of guanidine and biguanidine (for instance chlorhexidine diacetate) and the following types of substances with limited water-solubility: quaternary ammonium compounds (for instance ceramine, chloroxylenol, crystal violet, chloramine), aldehydes (for instance paraformaldehyde), compounds of dequaline, polynoxyline, phenols (for instance thymol, para chlorophenol, cresol) hexachlorophene, salicylic anilide compounds, triclosan, halogenes (iodine, iodophores, chloroamine, dichlorocyanuric acid salts), alcohols (3,4 dichlorobenzyl alcohol, benzyl alcohol, phenoxyethanol, phenylethanol), cf. furthermore Martindale, The Extra Pharmacopoeia, 28th edition, page 547-578; metal salts, complexes and compounds with limited water-solubility, such as aluminum salts, (for instance aluminum potassium sulfate $AlK(SO_4)2, 12H_2O$) and furthermore salts, complexes and compounds of boron, barium, strontium, iron, calcium, zinc, (zinc acetate, zinc chloride, zinc gluconate), copper (copper chloride, copper sulfate), lead, silver, magnesium, sodium, potassium, lithium, molybdenum, vanadium should be included; other compositions for the care of mouth and teeth: for instance; salts, complexes and compounds containing fluorine (such as sodium fluoride, sodium-monofluorophosphate, aminofluorides, stannous fluoride), phosphates, carbonates and selenium.

For additional compounds, see J. Dent. Res. Vol. 28 No. 2, page 160-171,1949, wherein a wide range of tested compounds are mentioned, the contents of which are incorporated herein by reference for all purposes.

Examples of active agents in the form of agents adjusting the pH in the oral cavity include for instance: acceptable acids, such as adipinic acid, succinic acid, fumaric acid, or salts thereof or salts of citric acid, tartaric acid, malic acid, acetic acid, lactic acid, phosphoric acid and glutaric acid and acceptable bases, such as carbonates, hydrogen carbonates, phosphates, sulfates or oxides of sodium, potassium, ammonium, magnesium or calcium, especially magnesium and calcium.

Examples of active agents in the form of anti-smoking agents include for instance: nicotine, tobacco powder or silver salts, for instance silver acetate, silver carbonate and silver nitrate.

Further examples of active agents are medicines of any type.

Examples of active agents in the form of medicines include caffeine, salicylic acid, salicyl amide and related substances (acetylsalicylic acid, choline salicylate, magnesium salicylate, sodium salicylate), paracetamol, salts of pentazocine (pentazocine hydrochloride and pentazocinelactate), buprenorphine hydrochloride, codeine hydrochloride and codeine phosphate, morphine and morphline salts (hydrochloride, sulfate, tartrate), methadone hydrochloride, ketobemidone and salts of ketobemidone (hydrochloride), beta-blockers, (propranolol), calcium antagonists, verapamil hydrochloride, nifedinpine as well as suitable substances and salts thereof mentioned in Pharm. Int., Nov. 85, pages 267-271, Barney H. Hunter and Robert L. Talbert, nitroglycerine, erythrityl tetranitrate, strychnine and salts thereof, lidocaine, tetracaine hydrochloride, etorphine hydrochloride, atropine, insulin, enzymes (for instance papain, trypsin, amyloglucosidase. glucoseoxidase, streptokinase, streptodomase, dextranase, alpha amylase), polypeptides (oxytocin, gonadorelin, (LH. RH), desmopressin acetate (DDAVP), isoxsuprine hydrochloride, ergotamine compounds, chloroquine (phosphate, sulfate), isosorbide, demoxytocin, heparin.

Other active ingredients include beta-lupeol, Letigen, Sildenafil citrate and derivatives thereof.

Dental products include Carbami, CPP Caseine Phospho Peptide; Chlorhexidine, Chlorhexidine di acetate, Chlorhexidine Chloride, Chlorhexidine di gluconate, Hexetedine, Strontium chloride, Potassium Chloride, Sodium bicarbonate, Sodium carbonate, Fluor containing ingredients, Fluorides, Sodium fluoride, Aluminum fluoride, Ammonium fluoride, Calcium fluoride, Stannous fluoride, Other fluor containing ingredients Ammonium fluorosilicate, Potasium fluorosilicate, Sodium fluorosilicate, Ammonium monofluorphosphate, Calcium monofluorphosphate, Potassium monofluorphosphate, Sodium monofluorphosphate, Octadecentyl Ammonium fluoride, Stearyl Trihydroxyethyl Propylenediamine Dihydrofluoride, Vitamins include A, B1, B2, B6, B12, Folin acid, niacin, Pantothene acid, biotine, C, D, E, K.

Minerals include Calcium, phosphor, magnesium, iron, Zink, Cupper, Iod, Mangan, Crom, Selene, Molybden. Other active ingredients include: Q10@, enzymes. Natural drugs including *Ginkgo Biloba*, ginger, and fish oil. The invention also relates to use of migraine drugs such as Serotonin antagonists: Sumatriptan, Zolmitriptan, Naratriptan, Rizatriptan, Eletriptan; nausea drugs such as Cyclizin, Cinnarizin, Dimenhydramin, Difenhydrinat; hay fever drugs such as Cetrizin, Loratidin, pain relief drugs such as Buprenorfin, Tramadol, oral disease drugs such as Miconazol, Amphotericin B, Triamcinolonaceton; and the drugs Cisaprid, Domperidon, Metoclopramid.

Active ingredients may comprise the below-mentioned compounds or derivates thereof but are not limited thereto: Acetaminophen, Acetylsalicylic acid Buprenorphine Bromhexin Celcoxib Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Pseudoefedrin, Rofecoxib, Tenoxicam, Tramadol, Valdecoxib, Calciumcarbonat, Magaldrate, Disulfuram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizin, leco-Ceterizin, Chlorcyclizine, Chlorpheniramin, Chlorpheniramin, Difenhydramine, Doxylamine, Fenofenadin, Guaifenesin, Loratidin, des-Loratidin, Phenyltoloxamine, Promethazin, Pyridamine, Terfenadin, Troxerutin, Methyldopa, Methylphenidate, Benzalcon, Chloride, Benzeth. Chloride, Cetylpyrid, Chloride, Chlorhexidine, Ecabet-sodium, Haloperidol, Allopurinol, Colchinine, Theophylline, Propanolol, Prednisolone, Prednisone, Fluoride, Urea, Miconazole, Actot, Glibenclamide, Glipizide, Metformin, Miglitol, Repaglinide, Rosiglitazone, Apomorfin, Clalis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Ephedrine, Phenylpropanolamine, Pseudoephedrine, Cisapride, Domperidone, Metoclopramide, Acyclovir, Dioctylsulfosucc., Phenolphtalein, Almotriptan, Eletriptan, Ergotamine, Migea, Naratriptan, Rizatriptan, Sumatriptan, Zolmitriptan, Aluminum salts, Calcium salts, Ferro salts, Silver salts, Zinc-salts, Aniphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamin, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminumaminoacetat, Cimetidine, Esomeprazole, Famotidine, Lansoprazole, Magnesiumoxide, Nizatide and or Ratinidine.

In an embodiment of the invention the confectionery comprises flavor.

In some embodiments, a confectionery product may contain aroma agents and flavoring agents including natural and synthetic flavorings e.g. in the form of natural vegetable components, essential oils, essences, extracts, powders, including acids and other substances capable of affecting the taste profile. Examples of liquid and powdered flavorings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

The confectionery product flavor may be a natural flavoring agent, which is freeze-dried, preferably in the form of a powder, slices or pieces or combinations thereof. The particle size may be less than 3 mm, preferably less than 2 mm or more preferred less than 1 mm, calculated as the longest dimension of the particle. The natural flavoring agent may in a form where the particle size is from about 3 μm to 2 mm, such as from 4 μm to 1 mm. Preferred natural flavoring agents include seeds from fruit e.g. from strawberry, blackberry and raspberry.

The aroma agents and/or flavors may be used in the amount from 0.01 to about 30% by weight of the final product depending on the desired intensity of the aroma and/or flavor used. Preferably, the content of aroma/flavor is in the range of 0.1 to 8% by weight of the total confectionery product.

Moreover, the invention relates to a method of manufacturing a confectionery according to claims 1-75 comprising the steps of providing at least one support module (SM) and attaching at least one transparent module (TM) thereto.

Moreover, the invention relates to a method of manufacturing a confectionery product according to claims 1-75 comprising the steps of providing at least one transparent module (TM) and attaching at least one support module (SM) thereto.

Moreover, the invention relates to a method of manufacturing a confectionery product according to claims 1-75 wherein the transparent module (TM) is manufactured at least partly in vacuum to minimize the content of bubbles in the produced module.

Furthermore, the invention relates to a use of a support module (SM) in a confectionery product for supporting a non-form stable transparent module (TM).

Furthermore, the invention relates to a use of a support module (SM) in a confectionery product according to claims 1-75, for supporting a non-form stable transparent module (TM).

DRAWINGS

The invention will now be described with reference to the drawings where

FIG. 1 illustrates a cross-section of a two-module embodiment of the present invention, FIG. 2 illustrates a cross-section of a two-module embodiment of the present invention with integrated elements IE, FIG. 3 illustrates a cross-section of a three-module embodiment of the present invention, FIG. 4 illustrates a cross-section of a further three-module embodiment of the present invention, FIG. 5 illustrates an embodiment of the present invention in a toy, FIG. 6 illustrates a further embodiment of the present invention, FIG. 7 illustrates a plural-module embodiment of the present invention, FIG. 8 illustrates a further three-module embodiment of the present invention, FIGS. 9-10 illustrate further two-module embodiment of the present invention, FIG. 11 illustrates a three-module embodiment of the present invention with integrated elements IE, FIG. 12 illustrates a further embodiment of a three-module embodiment of the present invention, and where FIGS. 13-14 illustrate further embodiments of the present invention.

DETAILED DESCRIPTION

Some structural properties of different confectionery products of the invention will be disclosed and explained in the initial part of the detailed description. The content and properties of the different modules of the different principle components of embodiments of the invention will be described subsequently.

FIG. 1 shows a cross-section of an embodiment of the invention, wherein a support module SM supports a transparent module TM of a confectionery product. The support module SM may e.g. include any of the support modules SM disclosed and explained in the examples of this document. The transparent module TM may comprise e.g. flavor or anything else as disclosed in this document.

The support module SM comprises a confectionery module which in this context comprises chewing gum formed as a shell within which the transparent module TM may be contained.

In this context the word confectionery is meant very broadly and covers e.g. any kind of chewing gum, toffee, liquorice, wine gum, fruit gum, candy, sweets, biscuit, chocolate, ice cream or the like.

An important function of the support module SM is to support the transparent module TM of the overall multi-module confectionery until consuming and hence, at the instant the confectionery is placed in the mouth of the consumer, this feature is no longer necessary.

Moreover, the confectionery products offers an improved chew-feel during the relevant two important chew phases, namely the initial chew phase where the chewer basically chews two or more not-yet thoroughly mixed confectionery modules—the transparent TM and the support module SM—and the final chew phase where the modules have been mixed by the chewing of the user. The final chew phase may be dealt with by adding e.g. softeners, sweeteners, etc. in the confectionery products non-transparent modules TM thereby allowing a mixing of the transparent module TM with chew-improving compounds at a stage where the resulting compromising of the visual performance is relatively irrelevant. The initial chew phase may be a little more critical and constrained due to the fact that the visual performance of the module counteract either the structural or rheological performance from the starting point.

An important function of the support module SM is to support the transparent module TM of the overall multi-module confectionery until consuming but it may also serve as a reservoir of chew-feel improving compounds which may be both released in the mouth of the consumer as e.g. taste deliverers and also partly be chewed into the transparent gum base module during the final chew phase when the visual performance, as mentioned above, is less important.

FIG. 2 shows a cross-section of another embodiment of the invention, wherein the embodiment shown in FIG. 1 further comprises two ball-shaped integrated elements IE located within the transparent module TM. Obviously it is within the scope of the invention that there may be one or more than two integrated elements IE placed in the transparent module TM, as well as they do not need to be ball-shaped.

Preferably, the integrated elements IE should be visually conceivable by the user prior to chewing in order to e.g. provide an improved impression of the confectionery or e.g. facilitate conception of what the integrated element actually contains or contributes with in the confectionery. This may e.g. be in the case where the confectionery is commercialized as a product having two different and distinct ingredients, preferably active ingredients as a user may actually be able to see two different integrated elements IE.

Evidently, this feature may also be very advantageous even when using only one integrated element IE as a user, again, it may be possible to look into the product and conceive the commercialized ingredient in an intuitive and attractive way.

FIG. 3 shows a cross-section of another embodiment of the invention, wherein the embodiment shown in FIG. 1 further comprises a further support structure FSS in order to completely encapsulate the transparent module TM. The further support structure FSS may typically be removable or at least transparent or digestible and may invoke that the shape of the transparent module TM is maintained at least partly prior to removal or chewing of the further support structure FSS.

Figure 6:
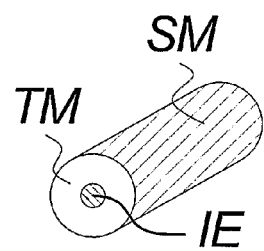

FIG. 6 shows another embodiment of the invention, wherein the confectionery is rod-shaped with one or more integrated elements IE distributed in the middle of the rod. The rod is surrounded by a support module SM. To cover the ends further support structures FSS may be used or alternatively the support module SM may be prolonged around the ends. Preferably, at least one of the support modules SM should be transparent. Obviously alternative shapes like e.g. this rod with or without the use of integrated elements IE are within the scope of the invention.

Figure 7:
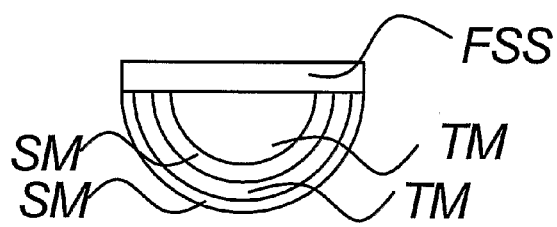

FIG. 7 shows a cross-section of another embodiment of the invention, wherein more than one layer of both transparent modules TM and support modules SM are used. Obviously any suitable number of the different modules may be used within the scope of the invention.

Figure 8:
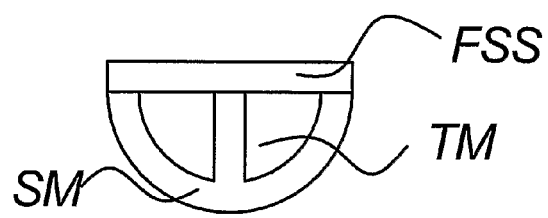

FIG. 8 shows a cross-section of another embodiment of the invention, wherein the support module SM is shaped to create two or more separate cavities for transparent modules TM. Obviously any shape of both the transparent module TM and the support module SM may be used within the scope of the invention.

Figure 9:
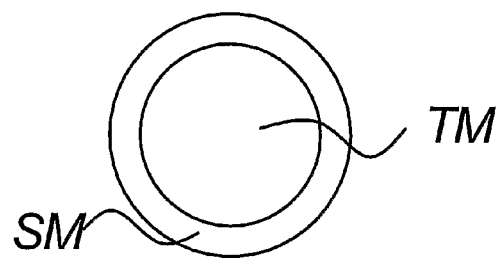

FIG. 9 shows a cross-section of another embodiment of the invention, wherein the support module SM completely encapsulates the transparent module TM. The shape shown here is completely ball-shaped, but obviously any shape may be used within the scope of the invention and the support module SM may also encapsulate several transparent modules TM.

Figure 1:

FIG. 10 shows a cross-section of another embodiment of the invention, wherein the embodiment of FIG. 1 is box-shaped with rounded corners.

FIG. 11 shows a cross-section of another embodiment of the invention, wherein an integrated element IE are distributed along the inner surface of the support module SM. The integrated elements IE may be distributed in many different ways in order to achieve different visual impressions.

FIG. 12 shows a cross-section of another embodiment of the invention, wherein the further support structure FSS comprises two further features, namely a thinner width and a more comprehensive attachment to the support module SM. Obviously, these two features may be independently applied in different embodiment of the invention.

FIG. 13 and FIG. 14 show further embodiments of the invention, where the transparent module TM is shaped differently, namely pyramid-shaped in FIG. 13 and box-shaped in FIG. 14. These shapes are obviously two of many different possibilities and for all these, support modules SM may be surrounding the shapes.

Different compositions of support modules SM and transparent modules TM are disclosed in the below part of the description. These modules may be combined and configured to obtain a desired product configuration.

EXAMPLES

Example 1

A gum base suitable for application in a chewing gum based support module SM of a confectionery product according to an embodiment of the invention was made according to the following example.
Preparation of Gum Base
A gum base is prepared, which comprises the following ingredients.

| Ingredients | % by weight |
| --- | --- |
| Elastomer | 15 |
| Natural resin | 19 |
| Synthetic resin | 20 |
| Fat/wax/emulsifiers | 27 |
| Fillers | 19 |

It should be emphasized that several other gum base compositions may be applied within the scope of the invention.

The elastomer and filler are added to a mixing kettle provided with mixing means like e.g. horizontally placed Z-shaped arms. The kettle has been preheated for 15 minutes to a temperature of about 120° C. The rubber is broken into small pieces and softened with mechanical action in the kettle. The resin is slowly added to the elastomer until the mixture becomes homogeneous. The remaining resin is then added to the kettle and mixed for 10-20 minutes. The elastomer together with the softening ingredients are added and mixed for 20-40 minutes until the whole mixture becomes homogeneous.

The mixture is then discharged into the pan and allowed to cool to room temperature from the discharged temperature of 120° C.

Example 2

Preparation of Chewing Gum

Chewing gum is prepared by use of the gum base in Example 1, with the following ingredients:

40% gum base
about 50% sweeteners
0.15% of aspartame
0.15% of acesulfame K
7% maltitol syrup
2% flavor
0.2% lecithin
and a small amount of glycerine.

Percentages applies by weight. The chewing gum products are prepared as follows:

The gum base is added to a mixing kettle provided with mixing means like e.g. horizontally placed Z-shaped arms. The kettle has been preheated for 15 minutes to a temperature of about 40-60° C.

One half portion of the sorbitol is added together with the gum base and mixed for 3 minutes. Maltitol syrup is added to the kettle and mixed for 1 minute. The remaining half portion of sorbitol is added and mixed for 1 minute. Then flavor is added to the kettle and mixed for 3 minutes. Then aspartame and acesulfame are added and mixed for 3 minutes. The resulting gum mixture is then discharged and e.g. transferred to a pan at a temperature of 40-48° C. The further support module SM is then formed into cores, sticks, balls, cubes, or any other desired shape, optionally followed by coating and polishing processes prior to formation of the final multi-module confectionery.

Evidently, within the scope of the invention, other processes and ingredients may be applied in the process of manufacturing the chewing gum. Variations of different ingredients are listed and explained in the above-detailed description.

Example 3

A support module SM was manufactured in a compression process, wherein the gum base comprised

| | |
|---|---|
| elastomer: | 19% by weight |
| natural resin: | 20% by weight |
| synthetic resin: | 20% by weight |
| fat/fillers: | about 23% by weight |
| wax: | 15% by weight |
| titanium dioxide | 1% by weight |
| aspartame | 1% by weight |
| flavor | 1% by wieght |

The ingredients were premixed for app. 20-40 min.

Example 4

The gum base of example 3 was granulated and during granulation of the gum base, a sweetener, sorbitol, was added 50:50. The granulation was performed during cooling.

The granulates are blended together with an amount of further sweetener, again sorbitol, approximately 18.6% by weight of the complete blend, further flavor additive, approximately 1.4% by weight of the complete blend and finally so-called flavor beads and high-intensity sweeteners were added. The high-intensity sweeteners comprises about 0.15% of aspartame+0.15% of acesulfame K=0.3% in total by weight.

Finally, the grinded blend was compressed into a chewing gum together with further conventional chewing gum ingredients. The resulting chewing gum is formed into a support module SM in any convenient form and may subsequently be attached to a transparent module TM according to e.g. any of the embodiments illustrated in the above-explained figures.

The method of manufacturing a chewing gum by a compression process is given in more details in WO 2004/004479A1, hereby incorporated by reference.

An alternative tabletting process and formulation is disclosed in WO2004/098307, WO2004/098306 and WO2004/098305, hereby incorporated by reference.

Example 5

A candy to be used as support module SM was manufactured from the ingredients given below.

| Group 1 | |
|---|---|
| Dried apples, ground ⅓ cm | 21.60 g |
| Apple juice concentrate 75 DEG Brix | 18.76 g |
| 70% Sorbitol solution | 37.48 g |
| Corn syrup, 34% maltose | 150.84 g |
| 96% Glycerine solution | 7.32 g |
| Group 2 | |
| Water | 15.48 g |
| Sodium Citrate | 0.8 g |
| Caramel color | 0.2 g |
| Group 3 | |
| Vegetable oil (Durkex 500) | 28.04 g |
| Emulsifier | 3.28 g |
| Group 4 | |
| Sucrose | 28.00 g |
| Citric acid, anhydrous | 3.24 g |
| Tapioca dextrin (Crystal gum) | 69.04 g |
| Flour, All-Purpose | 15.08 g |
| Bakers special cinnamon | 0.84 g |
| TOTAL | 400.00 g |

Preparation Procedure

1. Weigh out Group 1 ingredients and mix well.
2. Dissolve all of the Group 2 ingredients together, add to Group 1 mixture, and mix well.
3. Heat Group 3 ingredients to melt (melt at 65° C.) and add to the above mixture and mix until creamy.
4. Combine Group 4 ingredients, premix, add the above mixture, and mix well until thick and creamy.
5. Cook the mixture to approximately 117° C. with a constant stirring.
6. Cool the mixture, and extrude and/or roll to size and cut to a support module SM.

The resulting support module SM may subsequently be attached to a transparent module TM according to e.g. any of the embodiment illustrated in the above explained figures.

Example 6

A toffee to be used as support module SM was manufactured from the ingredients given below.

| Ingredients | Recipe weight % |
| --- | --- |
| Sweetened condensed skimmed milk | 25.2 |
| Glucose Syrup 42 DE | 33.7 |
| Sucrose | 22.8 |
| Hardened Palm Kernel Oil | 17.5 |
| Salt | 0.6 |
| Flavor | 0.2 |

The sweetened condensed skimmed milk, glucose syrup and sucrose are added to the boiling pan. Ingredients are heated to 13° C. and premixed for 15 minutes. The fat is melted, and then salt is added to the boiling pan. The toffee is then heated to 123° C. over a period of 23 minutes, after which time flavor is added. The toffee is poured onto an oiled cooling slab and turned periodically until cool, at which point it is processed in the desired form of the support module SM.

The toffee may also be manufactured on a continuous process by means of suitable plant equipment, where the same recipe can be utilized.

The resulting support module SM may subsequently be attached to a transparent module TM according to e.g. any of the embodiments illustrated in the above-explained figures.

Example 7

In the present example a ball-shaped integrated element is made by tabletting of flavor and sorbitol bulk sweetener.

Example 8

In the present example a ball-shaped integrated element is made by tabletting of red color and sorbitol bulk sweetener.

Example 9

In the present example a ball-shaped integrated element is made by tabletting of flavor, red color and sorbitol bulk sweetener and an active ingredient which in this context was a powdered pain-killer.

Example 10

A transparent module TM for use as a confectionery product was made according to the following process.

An amount of polyisobutylene was added to a mixing kettle provided with mixing means like e.g. horizontally placed Z-shaped arms.

The temperature of polyisobutylene was increased due to friction heating and the process was stopped when the polymer reached a desired consistency.

The resulting friction-mixed polyisobutylene was then formed into a desired shape.

Example 11

A transparent module TM for use in a confectionery product was made according to the following process.

An amount of polyisobutylene was added to a mixing kettle provided with mixing means like e.g. horizontally placed Z-shaped arms.

The temperature of polyisobutylene was increased due to friction heating and the process was stopped when the polymer reached a desired consistency.

The resulting friction-mixed polyisobutylene was then formed into a desired shape, here a box-shaped piece but now attached to a form stable support module SM, e.g. anyone of those seen in examples 1-6.

Example 12

An amount of polyisobutylene was added to a mixing kettle provided with mixing means like e.g. horizontally placed Z-shaped arms, followed by 5% by weight of maltitol syrup.

The temperature of the resulting blend was increased due to friction heating and the process was stopped when the blend reached a desired consistency.

The resulting friction-mixed blend was then formed into a desired shape, here a box-shaped piece but now attached to a form stable support module SM, e.g. anyone of those seen in examples 1-6.

Example 13

Example 13 was carried out similar to example 12 with the only difference that 10% by weight of maltitol syrup was added instead of 5% by weight.

Example 14

Example 13 was carried out similar to example 12 with the only difference that 15% by weight of maltitol syrup was added instead of 5% by weight.

Example 15

An amount of polyisobutylene was added to a mixing kettle provided with mixing means like e.g. horizontally placed Z-shaped arms, followed by 2% by weight of flavor.

The temperature of the resulting blend was held at 40-60° C. and the process was stopped when the blend reached a desired consistency.

The resulting friction-mixed blend was then formed into a desired shape, here a box-shaped piece but now attached to a form stable support module SM, e.g. anyone of those seen in examples 1-6.

Example 16

An amount of polyisobutylene was added to a mixing kettle provided with mixing means like e.g. horizontally placed Z-shaped arms, followed by the adding of high-potency sweetener, about 0.15% of aspartame+0.15% of acesulfame K=0.3% in total by weight.

The temperature of the resulting blend was increased due to friction heating and the process was stopped when the blend reached a desired consistency.

The resulting friction-mixed blend was then formed into a desired shape, here a box-shaped piece but now attached to a form stable support module SM, e.g. anyone of those seen in examples 1-6.

Example 17

An amount of polyisobutylene was added to a mixing kettle provided with mixing means like e.g. horizontally placed Z-shaped arms, followed by the adding of 2% by weight of flavor and high-potency sweetener, about 0.15% of aspartame+0.15% of acesulfame K=0.3% in total by weight.

The temperature of the resulting blend was held at 40-60° C. and the process was stopped when the blend reached a desired consistency.

The resulting friction-mixed blend was then formed into a desired shape, here a box-shaped piece but now attached to a form stable support module SM, e.g. anyone of those seen in examples 1-6.

Example 18

An amount of polyisobutylene was added to a mixing kettle provided with mixing means like e.g. horizontally placed Z-shaped arms, followed by the adding of 2% by weight of flavor and 5% by weight of maltitol syrup.

The temperature of the resulting blend was held at 40-60° C. and the process was stopped when the blend reached a desired consistency.

The resulting friction-mixed blend was then formed into a desired shape, here a box-shaped piece but now attached to a form stable support module, e.g. anyone of those seen in examples 1-6.

Example 19

Evaluation of Examples
Visual Evaluation

The different integrated elements IE introduced in the transparent module TM in examples 7-9 give a visual impression that is very pleasing for the consumer no matter whether it is small elements in varying colors such as blue, red, yellow, a single larger element maybe even shaped as a figure such as a spider, or combinations hereof.

Figure 2:
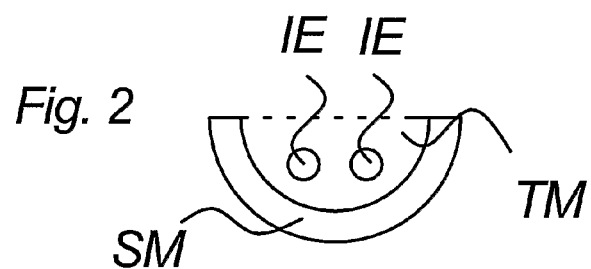
Figure 3:
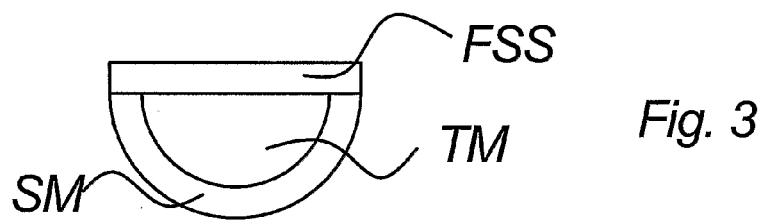
Figure 4:
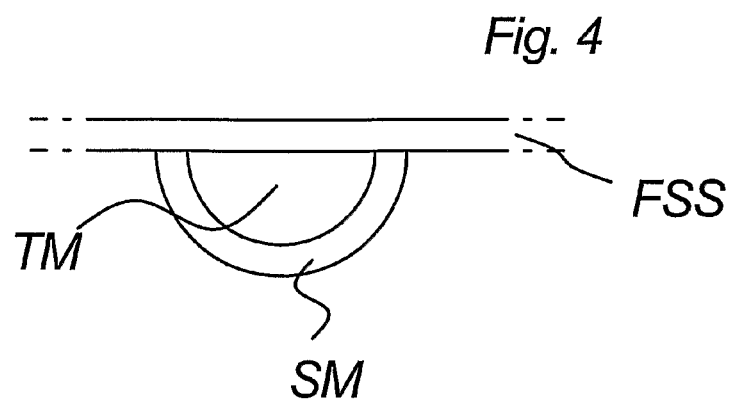
FIG. 4 shows a cross-section of another embodiment of the invention, wherein the further support structure FSS is not limited to be a part of an encapsulation of a single piece of confectionery alone but may possess a further functionality, e.g. to encapsulate several pieces or be an integrated element of another object e.g. a toy.
Figure 5:
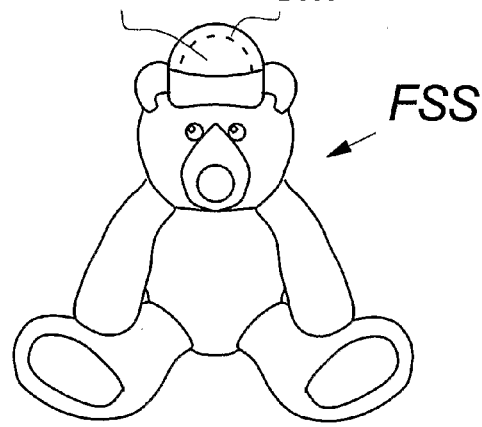
FIG. 5 shows another embodiment of the invention, wherein the further support structure FSS is the top of the head of a teddy bear figure and the confectionery has the appearance as a cap of the teddy bear which may be removed prior to chewing. The confectionery product is shown as a cross-section whereas the toy is shown as a front view.

Moreover, a visual evaluation of an embodiment according to FIG. 2 where the transparent module TM comprises any of the modules of examples 10-18 was made. The support module SM consisted of the chewing gum based support module SM of example 1 and 2, the transparent module TM corresponded to that of example 10 and the integrated element corresponded to that of example 8. All the evaluated embodiments indicated an advantageous appearance with respect to the desired transparency.

For the transparent module TM in examples 10-11, polyisobutylene alone, a very satisfying transmittance is observed.

For the transparent module TMs in examples 12-14, polyisobutylene and various amounts of maltitol syrup, a low but acceptable transmittance is observed.

For the transparent module TMs in example 15-17, polyisobutylene and flavor and/or high-potency sweetener, a very satisfying transmittance is observed.
Consistency Evaluation An example of FIG. 2 was provided, where the support module SM consisted of the chewing gum based support module SM of example 1 and 2, the transparent module TM corresponded to that of example 10 and the integrated element IE corresponded to that of example 8.

Five test persons chewed the resulting confectionery product.

The chew-feel during the initial phase was acceptable and rapidly the final chew phase was entered upon mixing of the two modules. This phase was characterized by a nice chew-feel and a satisfactory release of sweetener including the sweetener contained in the integrated element. It was also observed that the support module SM or the plasticizers of the support module SM clearly plasticized the polyisobutylene of the transparent module TM.

The nice chew feel was further related to the fact that the products swelled during the initial chew.

Example 20

Measured Evaluation

In order to have a satisfactory transparent module TM, it is necessary that the transparent module TM has a certain transmittance as measured by the method described below.

The setup which refers to ASTM D1746-03 included a Perkin Elmer Lamda EZ 201 double beam UV/VIS spectrophotometer with a light source and a filter delivering light at 546+/−0.5 nm. A Helma Secondary spectrometric calibration standard was applied.

Samples were positioned in disposable cuvettes—plastic brand PS 2.5 ml—with a light way if 10 mm through the sample.

Results are given in % transmittance, e.g. 56.8 indicating that 56.8% of the light at 546 nm passes trough 10 mm of the test material and reaches the detector.

In the table below some of the measured values are indicated as representative for what is observed.

| | Transmittance (%) at 546 nm in 10 mm cuvette | | |
|---|---|---|---|
| | A | B | C |
| TM from ex. 10-11 | 37 | 37.1 | 56.8 |
| TM from ex. 15 | 0.4 | 0.6 | 45.8 |
| TM from ex. 12 | 1.6 | 1.8 | 3.7 |

A indicates the transmittance after app. 24 hours at 60° C. in vacuum followed by 2 hours at 100° C.,
B indicates the transmittance after app. 24 hours at 60° C. in vacuum followed by 2 hours at 100° C. and then followed by 2 hours in supersonic bath, and
C indicates the transmittance after app. 24 hours at 60° C. in vacuum followed by 2 hours at 100° C. and then followed by 2 hours in supersonic bath and finally app. 11days at 60° C.

It is noted that the visual evaluation actually renders all the above examples acceptable and it is also noted that the transparency increased over time.

What is observed is that when polyisobutylene in a mixing with an ingredient X is satisfying and another mixing with a viscous ingredient Y is the same, then a mixing with both ingredients X and Y is also satisfactory. Thus, both sweetener and flavor may be added to the transparent module TM.

Moreover, it is noted that markedly improvements in the transmittance are seen over time due to the viscosity of the polyisobutylene, due to which air bubbles inside the transparent modules TM slowly will escape over time.

Finally, it is noted that a preferred embodiment of the invention involves at least one confectionery product comprising a support module SM consisting of chewing gum. The formulation of this chewing gum is explained in details below.

In general, a chewing gum composition typically comprises a water-soluble bulk portion, a water-insoluble chewable gum base portion and flavoring agents. The water-soluble portion dissipates with a portion of the flavoring agent over a period of time during chewing. The gum base portion is retained in the mouth throughout the chew. The term "chewing gum" refers to both a chewing and bubble type gum in its general sense.

The gum base is the masticatory substance of the chewing gum, which imparts the chew characteristics to the final product. The gum base typically defines the release profile of flavors and sweeteners and plays a significant role in the gum product.

The insoluble portion of the gum typically may contain any combination of elastomers, vinyl polymers, elastomer plasticizers, waxes, softeners, fillers and other optional ingredients such as colorants and antioxidants. Elastomer plasticizers may also generally be referred to as a resin or as a resinous compound. The composition of gum base formulations can vary substantially depending on the particular product to be prepared and on the desired masticatory and other sensory characteristics of the final product.

A gum base formulation may e.g. comprise from 1 to 80% elastomeric compounds, 2 to 85% elastomer plasticizers, 0 to 60% waxes, 5 to 65% softeners including emulsifiers, 0 to 70% fillers, and 0 to 35% miscellaneous ingredients such as antioxidants, colorants, etc. However, typical ranges (% by weight of the gum base) of the above gum base components are: 1 to 50% elastomeric compounds, 5 to 55% elastomer plasticizers, 0 to 40% waxes, 5 to 35% softeners, 0 to 50% fillers, and 0 to 5% miscellaneous ingredients such as antioxidants, colorants, etc. The gum base may comprise about 5 to about 95 percent, by weight, of the chewing gum, more commonly; the gum base comprises 10 to about 60 percent of the gum. Elastomers provide the rubbery, cohesive nature to the gum, which varies depending on these ingredients' chemical structure and how it may be compounded with other ingredients. Elastomers suitable for use in some embodiments of gum bases and chewing gums may include natural or synthetic types.

According to an embodiment, an elastomer to be used may be a copolymer made from styrene and isoprene Other or additional elastomers besides SIS may be any water-insoluble polymer known in the art, and includes those polymers utilized for chewing gum and bubble gum listed in U.S. Food and Drug Administration, CFR, Title 21, Section 172,615, as "Masticatory Substances of Natural Vegetable Origin" and "Masticatory Substances, Synthetic", the contents of which are incorporated herein by reference for all purposes.

Useful natural elastomers include natural rubber such as smoked or liquid latex and guayule, natural gums such as jelutong, lechi caspi, perillo, sorva, massaranduba balata, massaranduba chocolate, nispero, rosidinha, chicle, gutta percha, gutta kataiu, niger gutta, tunu, chilte, chiquibul, gutta hang kang.

Useful synthetic elastomers include high molecular weight elastomers such as butadiene-styrene copolymers, polyisoprene, polyisobutylene and isobutylene-isoprene copolymers, low molecular weight elastomers such as polybutene, polybutadiene and polyisobutylene, vinyl polymeric elastomers such as PVA, polyethylene, vinyl copolymeric elastomers such as vinyl acetate/vinyl laurate, vinyl acetate/vinyl stearate, ethylene/vinyl acetate, polyvinyl alcohol or mixtures thereof.

Butadiene-styrene type elastomers (SBR) typically are copolymers of from about 20:80 to 60:40 styrene:butadiene monomers. The ratio of these monomers affects the elasticity of the SBR as evaluated by mooney viscosity. As the styrene:butadiene ratio decreases, the mooney viscosity decreases.

The structure of SBR typically consists of straight chain 1,3-butadiene copolymerized with phenylethylene (styrene) and provides the non-linear molecular nature of these elastomers. The average molecular weight of SBR is <600,000 g/mole.

Isobutylene-isoprene type elastomers (butyl rubber) have molar percent levels of isoprene ranging from 0.2 to 4.0. Similar to SBR, as the isoprene:isobutylene ratio decreases, so does the elasticity, measured by mooney viscosity.

The structure of butyl rubber typically consists of branched 2-methyl-1,3-butadiene (isoprene) copolymerized with branched 2-methylpropene (isobutylene), and, as with SBR, this type of structure is non-linear in nature. The average molecular weight of butyl rubber is in the range from 150,000 g/mole to 1,000,000 g/mole.

Polyisobutylene (PIB) as with SBR and butyl, is also non-linear in nature. The low molecular weight elastomers provide soft chew characteristics to the polymer system and still provide the elastic qualities as do the other elastomers. Average molecular weights may range from about 30,000 to 120,000 g/mole and the penetration may range from about 4 millimeters to 20 millimeters. The higher the penetration, the softer the PIB. Similar to the SBR and butyl, the high molecular weight elastomers provide elasticity of the gum. Average molecular weight may range from 120,000 to 1,000,000 g/mole.

Vinyl copolymeric types of polymers may also be applied as a supplementary polymer of the gum base. For vinyl copolymeric types, the amount of vinyl laurate, vinyl stearate, or ethylene present in the vinyl laurate/vinyl acetate (VL/VA), vinyl stearate/vinyl acetate (VS/VA), or ethylene/vinyl acetate (EVA) copolymers respectively typically ranges from about 10 to about 60 percent by weight of the copolymer. Average molecular weights of these polymers may range from about 2,000 g/mole to about 100,000 g/mole.

The vinyl polymers as polyvinyl alcohol and PVA may have an average molecular weight from about 8,000 g/mole to about 65,000 g/mole.

Elastomers that may be used alone or in combination are e.g. combinations in a gum base of a synthetic elastomer having a high-molecular weight and a low-molecular-weight elastomer. Presently preferred combinations of synthetic elastomers include, but are not limited to, polyisobutylene and styrene-butadiene, polyisobutylene and polyisoprene, polyisobutylene and isobutylene-isoprene copolymer (butyl rubber) and a combination of polyisobutylene, styrene-butadiene copolymer and isobutylene isoprene copolymer, and all of the above individual synthetic polymers in admixture with PVA, vinyl acetate-vinyl laurate copolymers, respectively and mixtures thereof.

Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wants to provide more elastomeric chain exposure to the alkanic chains of the waxes.

In some embodiments, further polymeric or non-polymeric plasticizers may be applied such as triacetin, acetylated mono- and di- and triglycerides of short chain fatty acids, acetylated mono- and di- and triglycerides of medium chain fatty acids, acetylated monoglycerides of long chain fatty acids, glycerol ester of rosin and low molecular weight PVA. The two latter may also be referred to as a natural and synthetic resin, respectively, within the art. The above mentioned plasticizers may also be referred to as conventional resins in the following description.

The plasticizers used may be of one type or of combinations of more than one type. Typically, the ratios of one to the other are dependent on each respective softening point, the effect on flavor release, and the respective degree of tack they cause to the gum.

Examples of such synthetic resins include PVA, vinyl acetate-vinyl laurate copolymers and mixtures thereof. Examples of synthetic elastomers include, but are not limited to, synthetic elastomers listed in U.S. Food and Drug Administration, CFR, Title 21, Section 172,615, the contents of which are incorporated herein by reference for all purposes.

Examples of natural resins are: Natural rosin esters, often referred to as ester gums including as examples glycerol esters of partially hydrogenated rosins, glycerol esters of polymerized rosins, glycerol esters of partially dimerised rosins, glycerol esters of tally oil rosins, pentaerythritol esters of partially hydrogenated rosins, methyl esters of rosins, partially hydrogenated methyl esters of rosins, pentaerythritol esters of rosins, synthetic resins such as terpene resins derived from alpha-pinene, beta-pinene, and/or d-limonene, and natural terpene resins.

It is common in the industry to combine in a gum base a synthetic elastomer having a high molecular weight and a synthetic elastomer having a low molecular weight.

Examples of such combinations of are polyisobutylene and styrene-butadiene, polyisobutylene and polyisoprene, polyisobutylene and isobutylene-isoprene co-polymer (butyl rubber) and a combination of polyisobutylene, styrene-butadiene copolymer and isobutylene isoprene copolymer, and all of the above individual synthetic polymers in admixture with PVA, vinyl acetate-vinyl laurate copolymers, respectively and mixtures thereof.

In accordance with the general principles in manufacturing a chewing gum within the scope of the invention, variations of different suitable ingredients are listed and explained below.

In some embodiments the chewing gum may comprise coloring agents. According to an embodiment of the invention, the chewing gum may comprise color agents and whiteners such as FD&C-type dyes and lakes, fruit and vegetable extracts, titanium dioxide and combinations thereof.

Further useful chewing gum base components include antioxidants, e.g. butylated hydroxytoluene (BHT), butyl hydroxyanisol (BHA), propylgallate and tocopherols, and preservatives.

In an embodiment of the invention, the chewing gum comprises softeners in an amount of about 0 to about 18% by weight of the chewing gum, more typically about 0 to about 12% by weight of the chewing gum.

Waxes may be optional depending on the properties of the individual formulations. Petroleum waxes aid in the curing of the finished chewing gum as well as improve shelf-life and texture. Wax crystal size influences the release of flavor. Those waxes high in iso-alkanes have a smaller crystal size than those waxes high in normal-alkanes, especially those with normal-alkanes of carbon numbers less than 30. The smaller crystal size allows slower release of flavor since there is more hindrance of the flavor's escape from this wax versus a wax having larger crystal sizes. The compatibility of polymer systems made using normal-alkanic waxes is less when compared to polymer systems made with iso-alkanic waxes.

Waxes and fats may moreover be used for the adjustment of the consistency and for softening of the chewing gum base when preparing chewing gum bases.

Petroleum wax (refined paraffin and microcrystalline wax) and paraffin wax is composed of mainly straight-chained normal-alkanes and branched iso-alkanes. The ratio of normal-alkanes to iso-alkanes varies.

The normal-alkanic waxes typically have carbon chain lengths >C-18 but the lengths are not predominantly longer than C-30. The branched and ring structures are located near the end of the chain for those waxes that are predominantly normal-alkanic. The viscosity of normal-alkanic waxes is <10 mm$^2$/s (at 100° C.) and the combined number average molecular weight is <600 g/mole.

The iso-alkanic waxes typically have carbon lengths that are predominantly greater than C-30. The branched chains and ring structures are located randomly along the carbon chain in those waxes that are predominantly iso-alkanic. The viscosity of iso-alkanic waxes is greater than 10 mm2/s (at 100° C.) and the combined number average molecular weight is >600 g/mole.

Synthetic waxes are produced by means atypical of petroleum wax production and thus are not considered petroleum wax. The synthetic waxes may include waxes containing branched alkanes and copolymerized with monomers such as but not limited to propylene and polyethylene and Fischer Tropsch type waxes. Polyethylene wax is a synthetic wax containing alkane units of varying lengths having attached thereto ethylene monomers.

The natural waxes may include rice bran wax, bees' wax, carnauba wax or candelilla wax.

In some embodiments, any conventionally used and suitable type of wax and fat may be used, such as for instance rice bran wax, polyethylene wax, petroleum wax (refined paraffin and microcrystalline wax), paraffin, beeswax, carnauba wax, candelilla wax, cocoa butter, degreased cocoa powder and any suitable oil or fat, as e.g. completely or partially hydrogenated vegetable oils or completely or partially hydrogenated animal fats.

Softeners/emulsifiers may in some embodiments be added both in the chewing gum and the gum base.

The selection of softeners has an influence on the softness of the base. Softeners modify the texture, cause the hydrophobic and hydrophilic components of the base to be miscible, and may further plasticize the synthetic polymers of the polymer system. The emulsifiers, which belong to the group of softeners, provide the polymer system with water-binding properties, which confer to the polymer system a pleasant smooth surface and reduce its adhesive properties.

Softeners suitable for use in the polymer system include triglycerides of non-hydrogenated, partially hydrogenated and fully hydrogenated vegetable oils and tallow, cocoa butter and degreased cocoa powder and in addition to these the emulsifiers.

The group of triglycerides includes cottonseed, palm, palm kernel, coconut, safflower, rapeseed, sunflower, tallow, soybean, cocoa butter, medium chained triglycerides and the like.

The caproic, caprylic, capric, myristic, lauric and palmitic fatty acids of the triglycerides tend to plasticize the synthetic elastomers more than triglycerides containing predominantly stearic fatty acid.

To the group of emulsifiers belong the monoglycerides, diglycerides, acetylated mono and diglycerides, distilled mono- and diglycerides, glycerol monostearate, propylene glycol monostearate, Na-, K-, Mg- and Ca-stearates, glycerol triacetate, fatty acid monoglycerides (e.g. stearic, palmitic, oleic and linoleic acids), lactic acid esters and acetic acid esters of mono- and diglycerides, sugar esters of edible fatty acids also referred to as sucrose polyesters including those disclosed in WO 00/25598 hereby included by reference, lecithin and hydroxylated lecithin, most of these may contain triglyceride levels less than 2 percent by weight from their manufacturing processing.

The softeners including the emulsifiers may be used alone or at least two or more in combination.

Fillers used in polymer system modify the texture of the polymer system and aid in processing. Particle size has an effect on cohesiveness, density and processing characteristics of the polymer system and its compounding. The smaller the particle size, the more dense and cohesive the final polymer system. Also, by selecting fillers based on their particle size distribution, initial mass compounding may be varied, thus allowing alteration of the compounding characteristics of the initial mass during polymer system processing and ultimately the final chew characteristics of gums made from these polymer systems.

Fillers suitable for use in the polymer system include magnesium and calcium carbonate, ground limestone and silicate types such as magnesium and aluminum silicate, kaolin and clay, aluminum oxide, silicon oxide, talc, as well as titanium oxide, mono-, di- and tricalcium phosphate, sodium sulphate, cellulose polymers such as ethyl, methyl and wood or mixtures thereof.

Talc filler may be used in embodiments of gum bases and chewing gums that may come in contact with or employ acid flavors or provide an acidic environment needed to prevent degradation of an artificial sweetener by reacting with calcium carbonate type fillers. Mean particle size for calcium carbonate and talc fillers typically range from about 0.1 micron to about 15 microns.

The fillers may also include natural organic fibers such as fruit vegetable fibers, grain, rice, cellulose and combinations thereof.

In an embodiment of the invention, the chewing gum comprises filler in an amount of about 0 to about 50% by weight of the chewing gum, more typically about 5 to about 20% by weight of the chewing gum.

In addition to a, typically, water insoluble gum base portion, a typical chewing gum includes a water soluble bulk portion and one or more flavoring agents. The water-soluble portion may include bulk sweeteners, high intensity sweeteners, flavoring agents, softeners, emulsifiers, colors, acidulants, fillers, antioxidants, and other components that provide desired attributes.

Suitable bulk sweeteners include both sugar and non-sugar sweetening components. Bulk sweeteners typically constitute from about 5 to about 95% by weight of the chewing gum, more typically about 20 to about 80% by weight such as 30 to 60% by weight of the gum.

Useful sugar sweeteners are saccharide-containing components commonly known in the chewing gum art including, but not limited to, sucrose, dextrose, maltose, dextrins, trehalose, D-tagatose, dried invert sugar, fructose, levulose, galactose, corn syrup solids, and the like, alone or in combination.

Sorbitol can be used as a non-sugar sweetener. Other useful non-sugar sweeteners include, but are not limited to, other sugar acools such as mannitol, xylitol, hydrogenated starch hydrolysates, maltitol, isomalt, erythritol, lactitol and the like, alone or in combination.

High-intensity artificial sweetening agents can also be used alone or in combination with the above sweeteners. Preferred high-intensity sweeteners include, but are not limited to sucralose, aspartame, salts of acesulfame, alitame, neotame, twinsweet, saccharin and its salts, cyclamic acid and its salts, glycyrrhizin, dihydrochalcones, thaumatin, monellin, stevioside and the like, alone or in combination. In order to provide longer lasting sweetness and flavor perception, it may be desirable to encapsulate or otherwise control the release of at least a portion of the artificial sweetener. Techniques such as wet granulation, wax granulation, spray drying, spray chilling, fluid bed coating, coascervation, encapsulation in yeast cells and fiber extrusion may be used to achieve the desired release characteristics. Encapsulation of sweetening agents can also be provided using another chewing gum component such as a resinous compound.

Usage level of the high intensity artificial sweetener will vary considerably and will depend on factors such as potency of the sweetener, rate of release, desired sweetness of the product, level and type of flavor used and cost considerations. Thus, the active level of high potency artificial sweetener may vary from about 0 to about 8% by weight, preferably 0.001 to about 5% by weight. When carriers used for encapsulation are included, the usage level of the encapsulated sweetener will be proportionately higher.

Combinations of sugar and/or non-sugar sweeteners can be used in the chewing gum formulation processed in accordance with the invention. Additionally, the softener may also provide additional sweetness such as aqueous sugar or alditol solutions.

If a low-calorie gum is desired, a low-caloric bulking agent can be used. Examples of low caloric bulking agents include polydextrose, Raftilose, Raftilin, fructooligosaccharides (NutraFlora®), palatinose oligosaccharides; guar gum hydrolysates (e.g. Sun Fiber®) or indigestible dextrins (e.g. Fibersol®). However, other low-calorie bulking agents can be used.

In some embodiments, a chewing gum may contain aroma agents and flavoring agents including natural and synthetic flavorings e.g. in the form of natural vegetable components, essential oils, essences, extracts, powders, including acids and other substances capable of affecting the taste profile. Examples of liquid and powdered flavorings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

The chewing gum flavor may be a natural flavoring agent, which is freeze-dried, preferably in the form of a powder, slices or pieces or combinations thereof. The particle size may be less than 3 mm, less than 2 mm or more preferred less than 1 mm, calculated as the longest dimension of the particle. The natural flavoring agent may in a form where the particle size is from about 3 µm to 2 mm, such as from 4 µm to 1 mm. Preferred natural flavoring agents include seeds from fruit e.g. from strawberry, blackberry and raspberry.

Various synthetic flavors, such as mixed fruit flavors may also be used in the present chewing gum centers. As indicated above, the aroma agent may be used in quantities smaller than those conventionally used. The aroma agents and/or flavors may be used in the amount from 0.01 to about 30% by weight of the final product depending on the desired intensity of the aroma and/or flavor used. Preferably, the content of aroma/flavor is in the range of 0.2 to 3% by weight of the total composition.

In an embodiment of the invention, the flavoring agents comprise natural and synthetic flavorings in the form of natural vegetable components, essential oils, essences, extracts, powders, including acids and other substances capable of affecting the taste profile.

Further chewing gum ingredients, which may be included in some embodiments, include surfactants and/or solubilizers, especially when pharmaceutically or biologically active ingredients are present. As examples of types of surfactants to be used as solubilizers in a chewing gum composition according to an embodiment of the invention, reference is made to H. P. Fiedler, Lexikon der Hilfstoffe für Pharmacie, Kosmetik und Angrenzende Gebiete, pages 63-64 (1981) and the lists of approved food emulsifiers of the individual countries. Anionic, cationic, amphoteric or non-ionic solubilizers can be used. Suitable solubilizers include lecithin, polyoxyethylene stearate, polyoxyethylene sorbitan fatty acid esters, fatty acid salts, mono and diacetyl tartaric acid esters of mono and diglycerides of edible fatty acids, citric acid esters of mono and diglycerides of edible fatty acids, saccharose esters of fatty acids, polyglycerol esters of fatty acids, polyglycerol esters of interesterified castor oil acid (E476), sodium stearoyllatylate, sodium lauryl sulfate and sorbitan esters of fatty acids and polyoxyethylated hydrogenated castor oil (e.g. the product sold under the trade name CREMOPHOR), block copolymers of ethylene oxide and propylene oxide (e.g. products sold under trade names PLURONIC and POLOXAMER), polyoxyethylene fatty alcohol ethers, polyoxyethylene sorbitan fatty acid esters, sorbitan esters of fatty acids and polyoxyethylene stераrаriс acid esters.

Particularly suitable solubilizers are polyoxyethylene stearates, such as for instance polyoxyethylene(8)stearate and polyoxyethylene(40)stearate, the polyoxyethylene sorbitan fatty acid esters sold under the trade name TWEEN, for instance TWEEN 20 (monolaurate), TWEEN 80 (monooleate), TWEEN 40 (monopalmitate), TWEEN 60 (monostearate) or TWEEN 65 (tristearate), mono and diacetyl tartaric acid esters of mono and diglycerides of edible fatty acids, citric acid esters of mono and diglycerides of edible fatty acids, sodium stearoyllatylate, sodium laurylsulfate, polyoxyethylated hydrogenated castor oil, blockcopolymers of ethylene oxide and propyleneoxide and polyoxyethylene fatty alcohol ether. The solubilizer may either be a single compound or a combination of several compounds. In the presence of an active ingredient, the chewing gum may preferably also comprise a carrier known in the art.

Emulsifiers, which are used as softeners may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

According to an embodiment of the invention, the chewing gum may comprise a pharmaceutically, cosmetically or biologically active substance. Examples of such active substances, a comprehensive list of which is found e.g. in WO 00/25598, which is incorporated herein by reference, In an embodiment of the invention, the flavor may be used as taste masking in chewing gum comprising active ingredients, which by themselves have undesired taste or which alter the taste of the formulation.

The chewing gum may optionally contain usual additives, such as binding agents, acidulants, fillers, coloring agents, preservatives, and antioxidants.

Materials to be used for the above-mentioned encapsulation methods for sweeteners might e.g. include Gelatine, Wheat protein, Soya protein, Sodium caseinate, Caseine, Gum arabic, Mod. starch, Hydrolyzed starches (maltodextrines), Alginates, Pectin, Carregeenan, Xanthan gum, Locus bean gum, Chitosan, Bees wax, Candelilla wax, Carnauba wax, Hydrogenated vegetable oils, Zein and/or Sucrose.

In general, chewing gum may be manufactured by sequentially adding the various chewing gum ingredients to a commercially available mixer known in the art.

A mixing of chewing gum and gum base may generally be performed by a batch or a continuous processing technique. An example of basic applicable mixing principles is explained below.

After the initial ingredients have been thoroughly mixed, the chewing gum mass is discharged from the mixer and shaped into the desired form such as by rolling into sheets and cutting into sticks, extruded into chunks or casting into pellets.

Generally, the ingredients may be added and mixed in the running mixer. Colors, active agents and/or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor has been added.

The entire mixing procedure typically takes from five to fifteen min, but longer mixing times may sometimes be required. Those skilled in the art will recognize that many variations of the above described procedure may be followed. Including the one-step method described in US patent application 2004/0115305 hereby incorporated as reference.

The invention claimed is:

1. Confectionery product comprising at least one transparent module (TM) and at least one support module (SM), wherein said support module (SM) is rigid, elastic or flexible,
    wherein said transparent module (TM) is fully encapsulated by the support module (SM) or is fully encapsulated by the support module (SM) and one or more further support structures (FSS), wherein said transparent module comprises a gum base,
    wherein the transparent module comprises polyisobutylene in an amount from about 70% to about 100% of said transparent module (TM) by weight,
    wherein the polyisobutylene of said transparent module (TM) has a molecular weight (Mw) of about 10,000 g/mol to about 50,000 g/mol,
    wherein the polydispersity index (PDI) of the polyisobutylene contained in the transparent module (TM) is between approximately 1.5 and 10, and
    wherein the transparent module (TM) has a transmittance of at least 3% through a 10 mm sample of a transparent module (TM) when applying a 546 nm light beam to the transparent module (TM).

2. Confectionery product according to claim 1, wherein said transparent module (TM) comprises more than 90% polyisobutylene.

3. Confectionery product according to claim 1, wherein said transparent module (TM) consists of polyisobutylene.

4. Confectionery product according to claim 1, wherein said transparent module (TM) constitutes more than 1% by weight of said confectionery product and/or said support module (SM) constitutes more than 1% by weight of said confectionery product.

5. Confectionery product according to claim 1, wherein the transparent module (TM) has a transmittance of at least 40% measured according to ASTM (D1746-35).

6. Confectionery product according to claim 1, wherein said transparent module (TM) further comprises PVA as a transparent polymer.

7. Confectionery product according to claim 1, wherein the transparent module (TM) comprises a sweetener.

8. Confectionery product according to claim 1, wherein the transparent module (TM) comprises a liquid sweetener.

9. Confectionery product according to claim 1, wherein the transparent module (TM) comprises a liquid sweetener in an amount of less than 30% by weight.

10. Confectionery product according to claim 1, wherein at least one pharmaceutically, cosmetically or biologically active ingredient is added to said transparent module (TM).

11. Confectionery product according to claim 1, wherein said transparent module (TM) further comprises a flavoring agent.

12. Confectionery product according to claim 1, wherein said transparent module (TM) comprises a flavoring agent in an amount of less than 30% by weight, and/or said transparent module (TM) further comprises coloring agents.

13. Confectionery product according to claim 1, wherein said transparent module (TM) comprises at least one integrated element (IE).

14. Confectionery product according to claim 13, wherein said at least one integrated element (IE) is chosen from freeze-dried pieces of fruit, artificial sweetener, sugar, flavor, active ingredients, coloring agents and combinations thereof.

15. Confectionery product according to claim 1, wherein the support module (SM) comprises a sweetener releasable during chew, or sweetener and flavor releasable during chew.

16. Confectionery product according to claim 1, wherein the support module (SM) comprises elastomer plasticizers capable of plasticizing the polymers of said transparent module (TM).

17. Confectionery product according to claim 1, wherein at least one of said support modules (SM) consists of conventional chewing gum.

18. Confectionery product according to claim 1, wherein said support module (SM), consists of a chewing gum.

19. Confectionery product according to claim 1, wherein said support module (SM) is formed by compression.

20. Confectionery product according to claim 1, wherein said support module (SM) is a confectionery and/or an edible polymerfilm and/or a transparent polymerfilm.

21. Confectionery product according to claim 1, wherein said further support structure (FSS) is removable and/or edible and/or has a thickness of below 10 mm.

22. Confectionery product according to claim 1, wherein said confectionery product has a coating.

23. Confectionery product according to claim 1, wherein said confectionery product comprises coating in an amount of 0.1 to 95% by weight of a coated confectionery product.

24. Confectionery product according to claim 1, wherein said confectionery comprises two or more transparent modules (TM) spatially separated from each other and/or two or more support modules (SM) spatially separated from each other.

25. Confectionery product according to claim 1, wherein the transparent module (TM) weighs 0.01 to 10 grams.

26. Confectionery product according to claim 1, wherein the confectionery product comprises a flavoring agent.

27. Method of manufacturing a confectionery product according to claim 1, comprising the steps of providing at least one support module (SM) and at least one transparent module (TM) and attaching said transparent module (TM) thereto or, comprising the steps of providing at least one transparent module (TM) and attaching at least one support module (SM) thereto.

28. Method of manufacturing a confectionery product according to claim 1 wherein the transparent module (TM) is manufactured at least partly in a vacuum to minimize the content of bubbles in the produced module.

\* \* \* \* \*